May 1, 1962 M. B. RASMUSSON 3,031,978
FROZEN CONFECTION MACHINE
Filed March 12, 1959 7 Sheets-Sheet 1

INVENTOR.
MARLIN B. RASMUSSON
BY
Lothrop & West
ATTORNEYS

May 1, 1962 M. B. RASMUSSON 3,031,978
FROZEN CONFECTION MACHINE
Filed March 12, 1959 7 Sheets-Sheet 6

INVENTOR.
MARLIN B. RASMUSSON
BY Lothrop & West
ATTORNEYS

United States Patent Office 3,031,978
Patented May 1, 1962

3,031,978
FROZEN CONFECTION MACHINE
Marlin B. Rasmusson, 6601 Elvas Ave., Sacramento, Calif.
Filed Mar. 12, 1959, Ser. No. 799,005
5 Claims. (Cl. 107—8)

My invention is especially related to devices for the quantity production of frozen confections, usually made of ice cream or water ice, and is especially concerned with such confections in which the frozen portion is in the form of a block from which a wooden stick or handle projects. For making confections of this sort, there is a demand for machines which are relatively simple and straightforward yet which will produce a very large number of frozen confections in a short time with little or no supervision and for machines which will operate consistently and well despite variations from time to time in the materials being frozen. There is an absolute requirement of a high degree of sanitation under all conditions of operation and a substantial premium on virtually continuous operation despite occasional mishaps during the protracted functioning of the device.

It is therefore an object of my invention to provide a frozen confection machine capable of operating substantially continuously to produce a large number of frozen confections in a short time and with the utilization of but a small space and with relatively little attention.

Another object of the invention is to provide a frozen confection machine in which the parts subject to sterilization are readily available and in which many of the parts are automatically sterilized during the repeated operation of the machine.

A further object of the invention is to provide a frozen confection machine to freeze confections of various different sorts.

Another object of the invention is to provide a frozen confection machine in which the amount of equipment necessary for large production is substantially reduced over previous requirements.

Another object is, in general, to provide an improved frozen confection machine.

Other objects, together with the foregoing, are attained in the embodiment of the machine described in the accompanying description and shown in the accompanying drawings, in which.

While the frozen confection machine of my invention can readily be embodied in a number of different ways, it has been successfully embodied in a commercial form substantially as shown in the accompanying drawings, which are approximately to scale. This machine is especially adapted to produce a frozen confection of frozen water ice or frozen custard or ice cream generally in the shape of a tapered block and provided with a relatively flat straight handle, usually a wood stick with rounded ends, one of which is partially embedded in the frozen confection and the other of which projects therefrom.

The machine itself is designed to be easily portable and is supported on a floor 6. The machine includes a frame, generally designated 7, having supporting legs 8, 9 and 10 thereon which are adjustable so that the elevation and level of the machine can be readily established. The frame 7 itself is made up of various metal shapes and plates assembled in the customary way to afford an elongated structure extending to a convenient height above the floor and substantially rectangular in plan.

Figure 7:
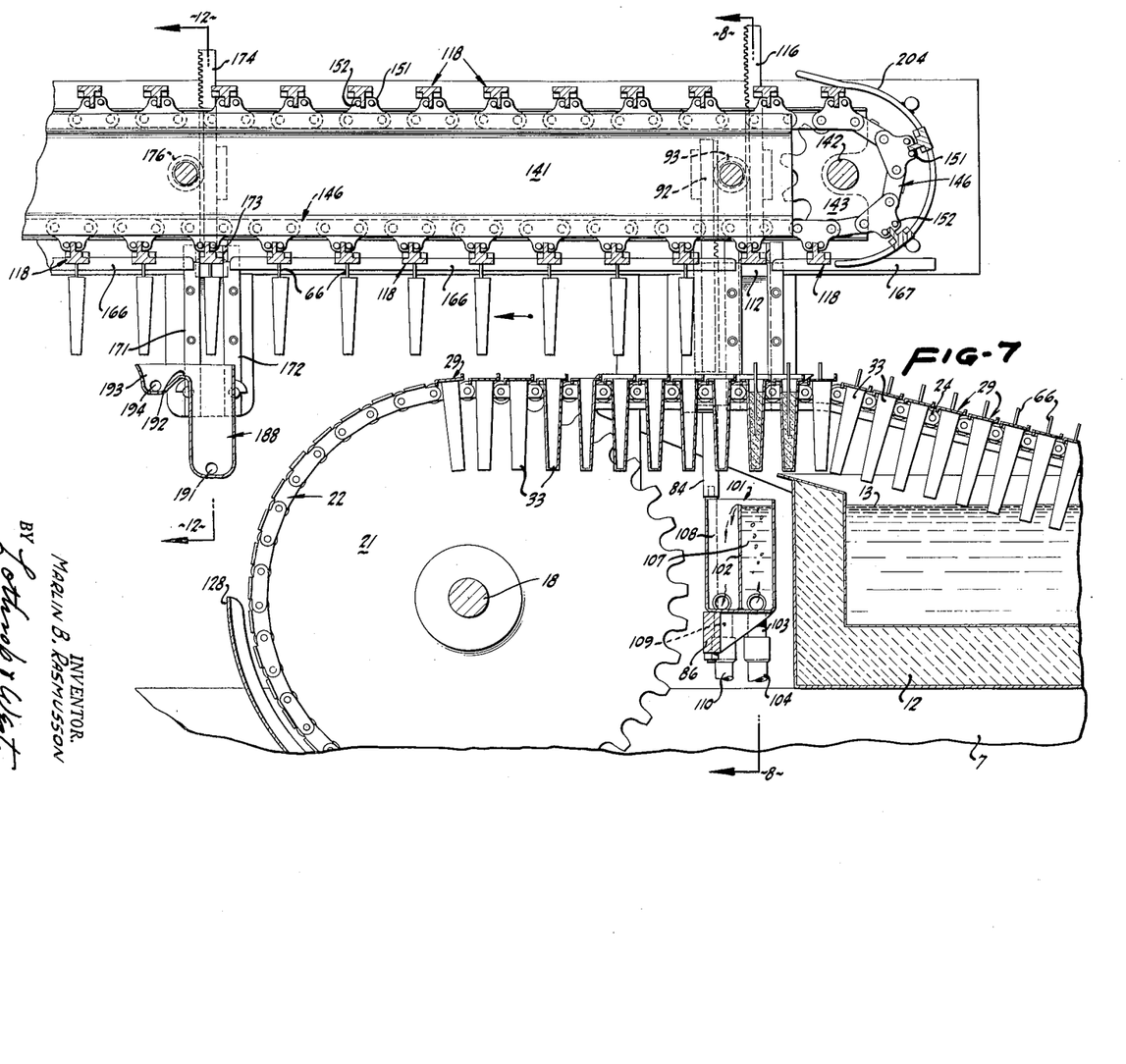
FIGURE 7 is an enlarged cross-section on a central vertical plane of the transferring portion of the machine.

Disposed on the frame 7 and occupying much of its length is an insulated tank 12 for the reception of brine or other refrigerant which, in operation, is established at an appropriate level 13 (FIGURE 7). The brine is either supplied in cold condition from a remote location and is recirculated to maintain its desired temperature or is appropriately maintained at an appropriate low temperature by heat transfer mechanism (not shown) on the frame 7.

Figure 8:
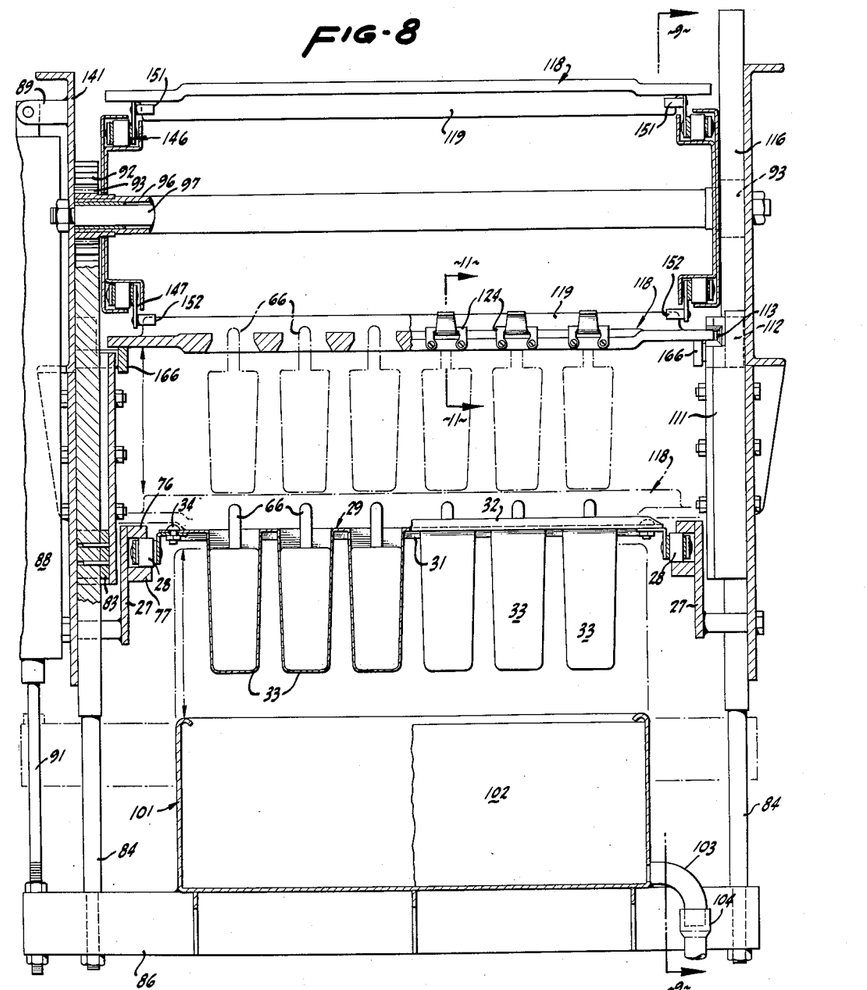
FIGURE 8 is a cross-section, the plane of which is indicated by the line 8—8 of FIGURE 7.

At one end of the frame in advance of the brine tank a transverse shaft 14 is journalled in a frame extension 16 and carries a pair of sprockets 17 forming part of a conveyor mechanism. Similarly mounted on the frame 7 beyond the other end of the brine tank 12 is a second cross-shaft 18 appropriately journalled in brackets 19 included in the frame. The shaft 18 carries a pair of sprockets 21 co-planar with the sprockets 17. Trained around the various sprockets are parallel conveyor chains 22. These chains are made up of special links 23 and are arranged around their sprockets in such a way as to have an upper run 24 extending above and down into the brine tank 12 just above the level 13 of the brine therein, thence upwardly out of the brine tank and to return in a lower run 26. For part of the upper and lower runs the chains 22 are provided with appropriate guides 27 so that they follow quite closely the closed circuit designed for them. To assist their movement around the sprockets and through the guides, the chains preferably include rollers 28 (FIGURE 8).

Spanning the distance between the two conveyor chains 22 and detachably secured to each of the bracket links 23 thereof is one of a plurality of transversely extending mold plates 29. Each mold plate is preferably a transversely elongated sheet of stainless steel or comparable material having its leading edge downturned to provide a flange 31 and its trailing edge upturned to provide a similar flange 32 in order to increase the stiffness of the mold plate, although retaining some ability to yield under superior force and return.

Forming part of the mold plate is a series of appropriately shaped molds 33. These conveniently are deep drawings also of stainless steel or the like and have the particular form or configuration desired for the ultimately finished frozen confection. Conveniently, the molds 33 are tapered on all of their sides and have rounded corners not only for easier ultimate extraction of the frozen confection but also for promoting sanitation and ease in cleaning.

The molds can vary from time to time depending upon the particular product to be produced, and for that reason the means for securing the detachable mold plates 29 to the various brackets of the links 23 conveniently are fasteners 34 which are adequately secure when tight but which can readily be freed or removed for changing the plates 29. Under normal operations a complement of mold plates for the machine is left in place for a protracted period, although if a plate is defective or damaged in any way it can readily be removed and replaced, even during operation of the machine.

Means are provided for advancing the conveyor with the molds thereon in a predetermined fashion. While it is possible to advance the conveyor continuously and to arrange the operation of the machine accordingly, it is preferred to advance the conveyor intermittently in a step by step fashion. That is, the conveyor is advanced a predetermined amount and then is permitted to rest for a predetermined time prior to the next advancement. In order so to advance the conveyor, the pair of sprockets 21 secured to the cross-shaft 18 is provided with appropriate driving mechanisms. Since these are duplicated on the opposite sides of the machine, a description of one applies equally to the other.

Each of the sprocket wheels is provided with a ring of projecting pins 36 having the same angular spacing as the sprocket teeth. Arranged on the frame alongside the adjacent sprocket is a guide track 37 constraining a carriage 38 to rectilinear movement. Each of the carriages is provided with a pawl 39 pivoted to the carriage by a pin 41 (FIGURES 3 and 5) so that the pawl 39 is pivoted off center with its lower, trailing portion much heavier than its leading portion. The bottom of the pawl 39 is adapted to rest against an abutment plate 42 forming part of the carriage 38. The two carriages are linked together transversely of the machine by a cross-bar 43. This is secured at its center to a plunger rod 44 forming part of a pneumatic jack 46 fastened at its base end to a strap 47 included in the main frame 7 of the machine.

In the operation of this structure, when the jack 46 is supplied with air under pressure at an appropriate time in the cycle of operations of the device, the plunger rod 44 is projected and thus advances the cross-bar 43 and the two carriages 38. After a short initial portion of their advancement, the two pawls 39 engage the next adjacent pins 36 on the sprockets 21. The pawls are prevented from retrograde rotation by the plates 42 so that the sprockets are advanced one step, the amount of advance being regulated by the extent of travel of the jack plunger rod 44.

Figures 3, 4, 5, 6:
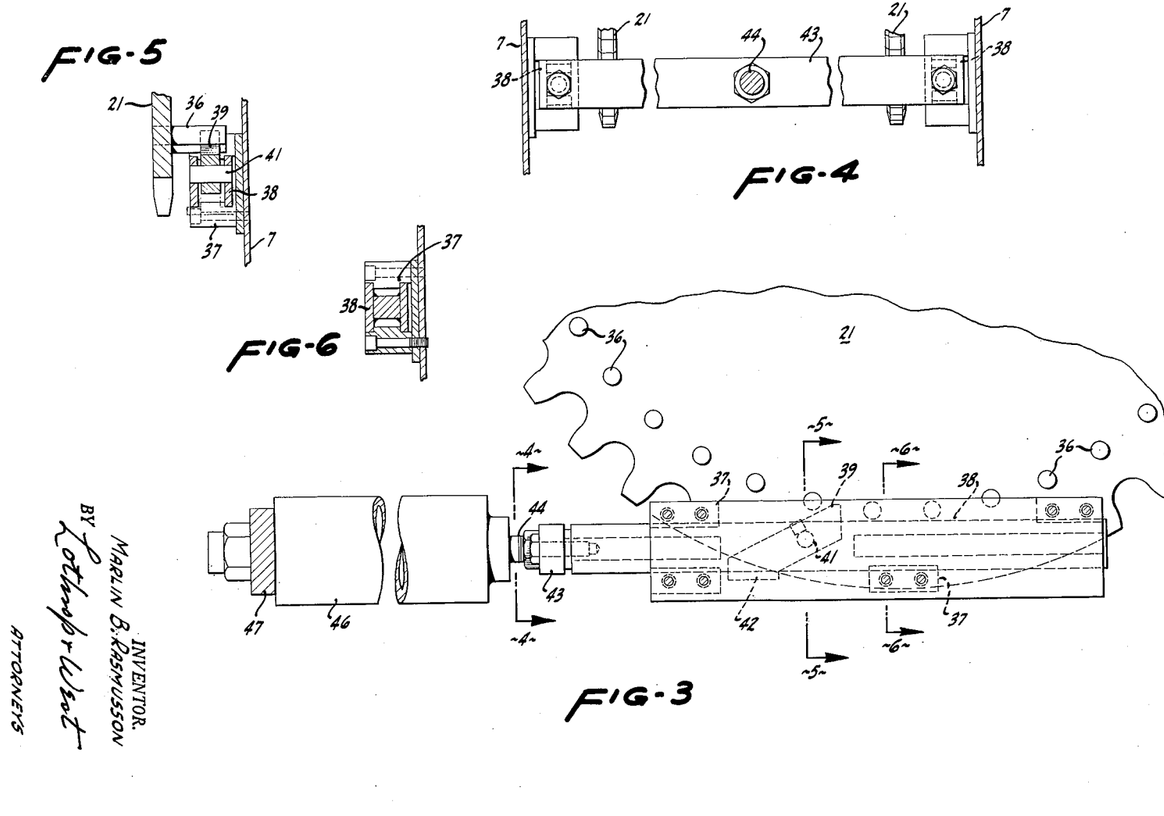
FIGURE 3 is an enlarged detail principally in side elevation with portions being broken away showing the mechanism for advancing the conveyor.
FIGURE 4 is a cross-section, the plane of which is indicated by the line 4—4 of FIGURE 3.
FIGURE 5 is a detail in section, the plane of which is indicated by the line 5—5 of FIGURE 3.
FIGURE 6 is a cross-sectional detail, the plane of which is indicated by the line 6—6 of FIGURE 3.

When the sprockets are so rotated in step, the entire conveyor mechanism partakes of a similar advancement. Each of the mold plates is advanced one step also and then occupies the position previously occupied by the next adjacent mold plate. At the end of the advance stroke, the air supply to the hydraulic jack 46 is reversed and the jack plunger rod 44 is fully retracted. During the retraction, the resistance to movement of the sprockets 21 is considerable so that the pawls 39, being restrained only by the weight of their lower, heavy portions, pivot freely about their pins 41 and pass under the obstructing pins 36 to resume a position substantially as shown in FIGURE 3 and ready for the next actuation of the pneumatic jack 46.

As the molds are advanced step by step by the pneumatic mechanism, they round the sprockets 17 at the head or charging end of the machine. Eventually, each mold plate finds itself in an initial position at a substantial height on the frame 7 and directly below the nozzles 51 of a confection dispensing unit 52. This unit is periodically filled with the liquid confection to be dispensed, whether ice cream mix, water ice mix or comparable liquid, and is designed to be operated intermittently and alternately with the step by step advancement of the conveyor. The filling unit simultaneously dispenses measured amounts of confection to one series of molds, usually six in number (as illustrated in FIGURE 8), which are at the moment immediately subjacent the transverse series of nozzles 51.

A dispensing mechanism of this sort is shown and described in my patents numbered 2,850,051 and 2,850,990, wherein it is fully described. In the present instance the framework of the filling mechanism is provided with suitable hubs 53 which are removably held on studs 54 upstanding from the frame extension 16 so that the entire confection mix mechanism 52 can be lifted and replaced as a unit when desired.

The filling unit includes a pneumatic jack 56 which preferably is actuated between the steps of actuation of the conveyor so that when a mold plate with its molds is stationary below the nozzles 51 a charge of confection mix of a suitable, measured amount is deposited in each one of the molds 33.

After being appropriately charged or filled, the successive molds advance by successive steps as guided by the guides 27 down an incline toward the interior of the brine tank 12. Eventually the guides 27 are disposed substantially horizontally at an elevation so that the molds are partially immersed in the brine, preferably at a level so that the top of the confection or filling within the mold is substantially even with the surface of the brine in the tank in order to afford a rapid heat transfer from the confection to the brine. The step by step advancement of the various molds within the brine tank produces some agitation of the brine in addition to that due to its natural flow through the tank and also some agitation of the confection and so assists substantailly in increasing the rate of heat transfer from the confection into the brine.

As the molds advance step by step in the brine tank, the confection contained therein gradually freezes, the freezing starting next to the metal of the molds and progressing inwardly from the sides and upwardly from the bottom. At some point in the advancement of the molds through the brine tank, the content of the molds is partially frozen, the outer portions being solid and the inner portion having a somewhat mushy or semifirm characteristic.

The point at which the consistency of the center part of the confection begins to acquire a semisolid state varies in accordance with several factors. It varies with the nature of the confection itself, with the temperature of the brine, with the initial temperature of the confection, with the rate of advancement through the brine tank, with the degree of external and internal agitation and possibly other variables.

Pursuant to this invention and to take into account the variable point in the advancement of the molds at which the mix becomes semicongealed, there is provided a stick inserting unit 61 mounted on a longitudinally movable carriage 62. This includes wheels 63 turning on rails 64 upstanding from the frame 7 at the opposite sides of the brine tank so that the unit 61 can be moved to any selected location along the brine tank and to the proper point of semicongelation for the particular item being frozen and the particular, existing conditions of freezing. A releasable clamp 65 engaging one of the rails 64 holds the stick inserting unit 61 firmly in any selected position along the rails.

The stick inserting unit 61 is disclosed in my copending application entitled "Frozen Confection Machine Stick Inserter," Serial No. 777,518, filed December 1, 1958, and is an apparatus which takes appropriate sticks 66 (FIGURE 8) from a hopper 69 and arranges them in a series spaced the same as the spacing of the molds 33 and in the same number. The stick inserting unit has pneumatic jacks 71 and 72 appropriately operated in time with the operation of the machine to project and position individual sticks within the individual subjacent molds. Preferably, the stick positioning or insertion is accomplished when the main conveyor is stationary; that is, between successive ones of its intermittent steps of conveyor advancement.

The effect of the stick inserting unit is to position simultaneously a series of wooden sticks within the series of molds in a mold plate and with reasonable accuracy to position each single stick in the center of its respective mold, as seen in plan. The stick inserting mechanism also lowers each of the sticks to a predetermined point in each mold or approximately so. The mold plate yields downwardly slightly during stick insertion if the mix is relatively hard, thus avoiding stick breakage. The result of the cycle of the stick inserting unit is to position in each of the molds of the subjacent mold plates an individual stick properly positioned not only in all horizontal directions but also properly positioned in the vertical relationship.

It sometimes occurs that the stick inserting unit misses either in introducing a stick or in positioning the stick accurately. In some cases, these deficiencies can be simply ignored since they occur very infrequently and the deviation from the desired positioning is not so great as to interfere with the operation of the machine. In other instances and under certain infrequent conditions of production of novelties or special frozen confections, it is possible for an operator downstream of the stick inserting unit either to rectify difficulties in positioning of the sticks or to position omitted sticks or even to introduce by hand other additions to the partly frozen confection since the freezing of the confection is still not so complete but that this additional step can be accomplished in the molds adjacent to but downstream of the stick inserting unit 61.

Figure 2:
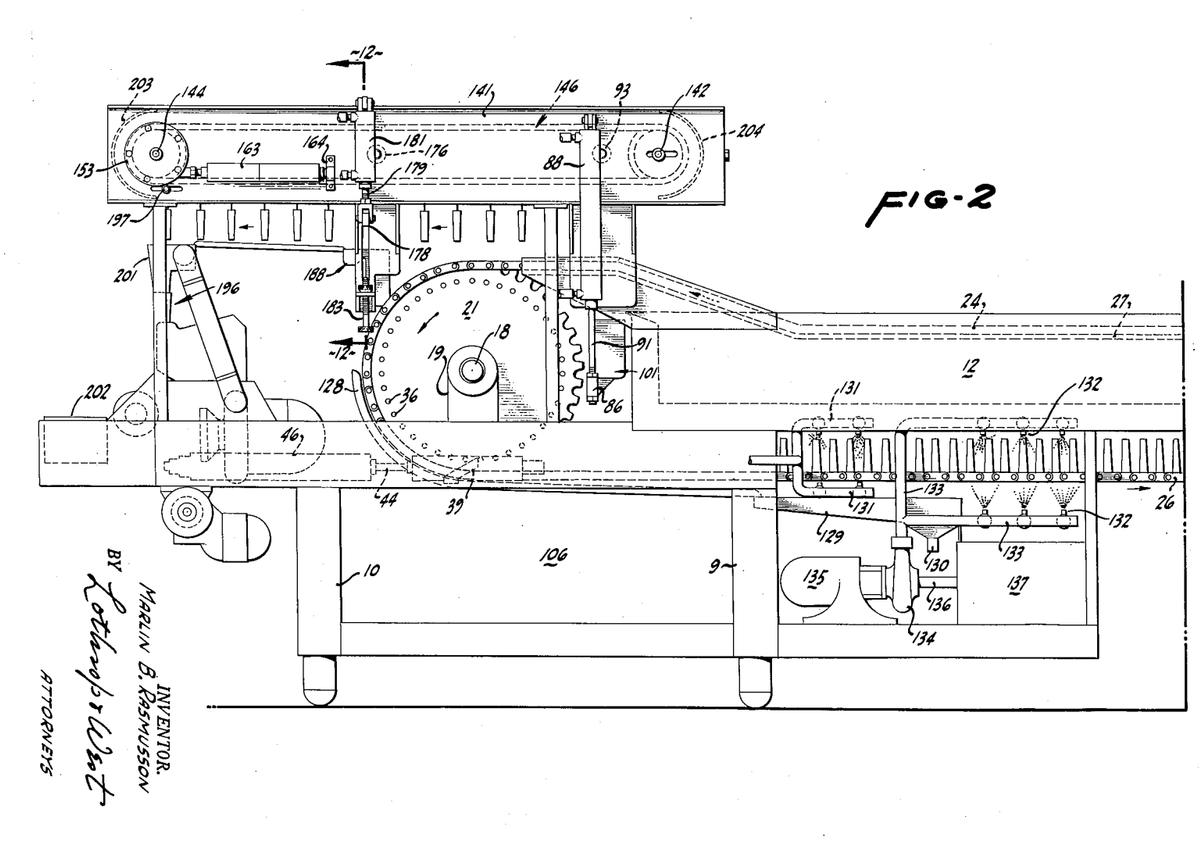
FIGURE 2 is a side elevation of the exit end of the machine, FIGURES 1 and 2 when considered together presenting the side elevational aspect of the machine.

As the semifrozen confections with the sticks inserted therein advance farther along the length of the brine tank, the freezing continues and the sticks ultimately are frozen solidly into completely frozen confections. At this time or shortly thereafter in the advancement of the mold plates, they begin the ascent of upwardly inclined parts of the guides 27 (FIGURE 2) and the molds are lifted upwardly out of the brine and out of the brine tank itself.

After the mold plates on the conveyor reach the top of the upwardly disposed incline and after the outside of the various molds drains of brine as they leave the brine tank, the mold plates enter onto a straight portion of the guides 27 which leads to a separating station (FIGURES 2, 7, 8 and 9). In the separating station the conveyor chains are appropriately confined between the upper portion 76 and the lower portion 77 of the guides 27 and are thus held against all displacement except in a fore and aft direction.

At a time during which the mold plates are stopped between steps of advancement of the conveyors, a thawing operation takes place at the separating station. Upstanding from the opposite sides of the frame 7 are substantially duplicate mechanisms, the description of one of which applies to the other. Vertical guides 81 and 82 direct the vertical movement of a block 83 from which a support rod 84 depends. A cross-bar 86 is secured to the support rods 84 and extends transversely of the frame 7. A pneumatic jack 88 at its upper end is secured to a bracket 89 forming part of the frame 7 and at its lower end has a jack rod 91 adjustably secured to the cross-bar 86.

When the jack 88 is energized downwardly, the bar 86 is moved to its lowermost position and through the rods 84 also moves the blocks 83 to their lowermost position in the guides 81 and 82. When the pneumatic jack 88 is energized in the opposite direction, the cross-bar 86 is lifted to its uppermost position, the rods 84 are likewise lifted and carry the blocks 83 with them to their uppermost position.

In order that the motion on the opposite sides of the frame will be precisely the same even though but one pneumatic jack 88 is employed, each block 83 also carries a rack bar 92 engaging an appropriate gear pinion 93 and held in place by a backing plate 94. The pinions 93 on the opposite sides of the machine are joined for rotation in unison on a cross-tube 96 (FIGURE 8) which is journalled on a stay bolt 97 spanning the machine frame 7. With this mechanism, there is provided a uniform vertical movement of the cross-bar 86 and all mechanism connected therewith.

Fastened on the cross-bar 86 is a duplex thawing tank 101. This is a substantially rectangular tank having a central transverse partition 102 of somewhat less height than the outer walls of the tank. The tank has an inlet fitting 103 connected by a flexible hose 104 to a suitable source of hot water not illustrated in detail but contained on the frame 7 behind the panel 106 spanning the space between the frame legs 9 and 10. By reason of the hot water supply, a current of hot water flows continuously to the compartment 107 of the tank 101 and overflows the central partition 102, acting as a weir, into the secondary compartment 108 of the tank 101. An overflow fitting 109 is connected to a flexible hose 110 returning to the hot water supply behind the panel 106 for waste or recirculation, depending on the particular conditions of operation.

With this portion of the mechanism, the pneumatic jack 88 is energized at an appropriate time when the main conveyor is stationary between steps and the cross-bar 86 is lifted. This lifts the hot water tank 101 into an upper position in which the tank is stopped just short of the mold bar 29 and in a position so that the molds depending from such bar are all immersed in the hot water to as great an extent as possible and preferably to a level higher than the level of frozen confections in the molds. The immersion of the molds causes an overflow of the hot water from the compartment 107 into the compartment 108 and in effect pumps the hot water from the tank 101 for subsequent replacement through the hose 104.

In the usual case, the duration of immersion of the molds in the hot water is sufficiently long so as partially to thaw the confection. The thawed portion is a relatively minor amount of the total volume of the confection and simply frees the outer surface, or skin, of the confection from the adjacent walls and bottom of the metal confection mold.

In some instances it is desired to prolong the immersion of the mold and in that case the hot water compartment 107 is made wider (as seen in FIGURE 7) and actually encompasses two transverse sets of molds in two successive cycles of operation. After the hot water tank has been held around the molds for a sufficient period of time, the connections to the pneumatic jack 88 are reversed, and the cross-bar 86 and the tank 101 are returned to the lowermost position (as seen in FIGURES 7 and 8).

Also in accordance with the invention, mechanism is provided for withdrawing the partly thawed confections and the sticks frozen therein from the molds either while the molds are being thawed or shortly after they have been appropriately thawed. For this reason, the upright guides 81 and 82 at the opposite sides of the frame are supplemented by side guides 111 serving to guide track blocks 112 (FIGURE 8). Each of these blocks has a horizontal dimension substantially the same as that of one of the mold plates 29 and is likewise provided with a horizontal groove 113 having flared ends.

Each of the track blocks 112 is not only guided by the guides 82 and 111 but also is secured to a rack bar 116 meshing with the other side of the gear pinion 93 and backed by a plate 117. With this connection, the track blocks 112 both descend uniformly from an upper position to a lower position as the cross-bar 86 is rising from its lower position to its upper position, and this occurs during the time that the main conveyor is between steps.

Designed to extend between the facing grooves 113 of the oppositely disposed track blocks 112 is a carrier bar 118. This is conveniently a light metal casting of sufficient length to span the width of the machine and of sufficient vertical dimension so as to be relatively stiff and unyielding. To that end a stiffening rib 119 (FIGURE 11) is provided on the carrier bar 118. At appropriate intervals the carrier bar is provided with bosses 121 spaced in precisely the locations to register with subjacent molds 33 on the mold plate 29.

Each of the bosses 121 is pierced by a somewhat elongated aperture 122 of sufficient extent freely to receive a stick 66 from the subjacent confections in the associated mold 33. The aperture 122 is relatively large so that the stick if slightly out of position can nevertheless be accommodated. To guide the stick into the aperture there is afforded an inclined entrance throat 123 in the bar 118. As the track blocks 112 descend, they carry the bar 118 with them into a lower position. In this location the bar is very close to the mold plate 29 with the various sticks 66 extending upwardly through the entrance throats 123 and extending through and to a point above the apertures 122 in the bosses 121.

Also mounted on the bar 118 are retainers for each of the sticks 66. These retainers can take various forms but, as shown herein, each includes a holder plate 124 of spring metal detachably held in place by screws 126. The plate 124 is curved toward a position just above the aperture 122 and is provided with a sharpened point 127. Normally, the point 127 lies very closely adjacent the upstanding rib 119 so that as the bar 118 descends and the sticks 66 project upwardly above the bosses 121, the springy metal of the plates 124 is urged slightly out of the way until finally the sharp points 127 dig into the soft material (usually wood) of the sticks 66.

After the bar 118 has achieved its lowermost position, and when the jack 88 is reversed to lower the hot water tank 101, the track blocks 112 are simultaneously lifted carrying the carrier bar 118 upwardly toward its original position. In the meantime, the sharpened points 127 have engaged the sticks 66 and, being inclined, prevent retrograde movement. Thus, the sticks are lifted upwardly with the carrier bar 118 and the confections rise also since they have just been superficially thawed and are freely released from the molds 33. Since some of the confection has been melted, although the molds are substantially empty after the confections have been lifted, there is a small residue of melted confection which remains behind therein.

During successive advances of the mold plates 29 with the step by step advancement of the main conveyor, the mold plates round the sprockets 21 at the discharge end of the machine and eventually occupy an inverted position over the hot water unit behind the panel 106. A drain plate 128 spanning the main frame underlies the molds as they are being inverted and catches any gravital drainage therefrom and carries it to a drain pan 129 leading to a drain pipe 130 extending away from the main frame.

After the inverted and returning molds have had a substantial time to drain by gravity, they come into a position beneath the brine tank whereat certain cleaning mechanism is disposed. The initial cleaning is accomplished by upper and lower sprays 131 which thoroughly jet the outside and the inside of the molds with hot water and remove substantially all of the material adherent thereto. If occasionally a stick is not inserted or a confection for any reason has not been lifted, the hot water sprays 131 dislodge the skipped and inverted confection and melt it and cause it to flow to the drain pipe 130.

As the inverted and empty molds continue, they are further subjected to a final cleaning by sprays 132. These are supplied through a manifold 133 with cleaning liquid under high pressure discharged from a pump 134 suitably mounted on the frame and driven by an electric motor 135. The pump receives its cleaning liquid through a connection 136 from a tank 137. In this way, the initial washing of the molds produces a discharge which is separately carried away through the drain pipe 130 whereas the subsequent final washing of the molds can take place with some recirculation of the washing material from the tank 137.

Figure 1:
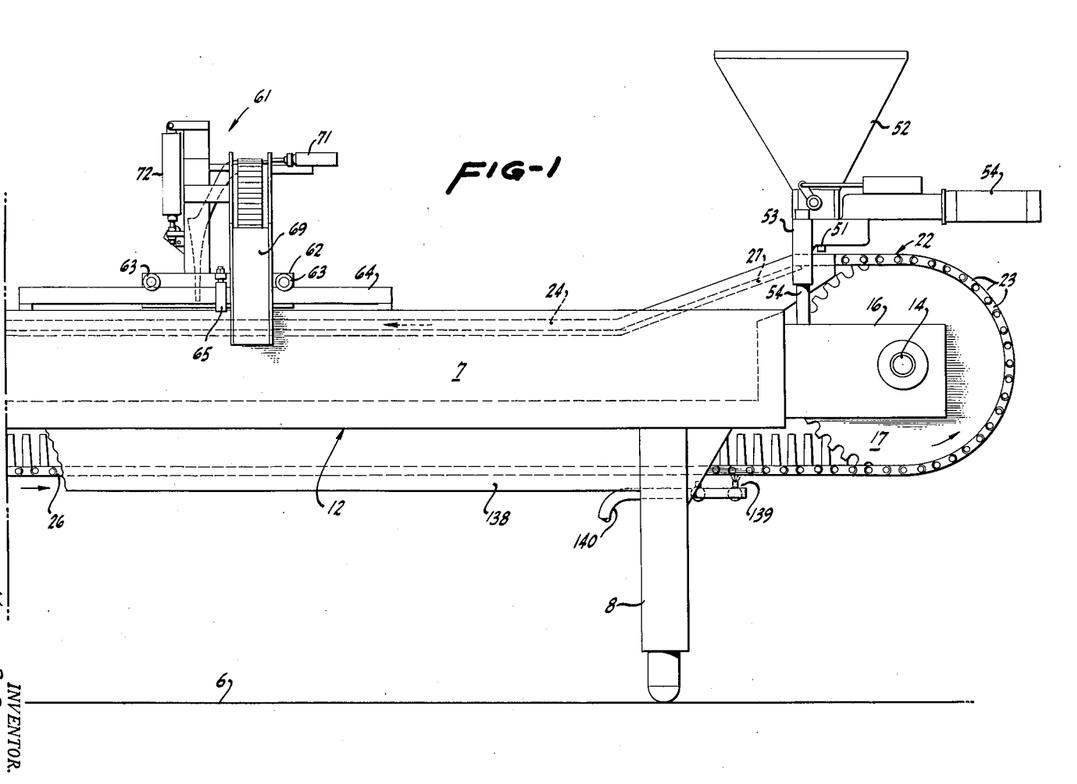
FIGURE 1 is a side elevation of the entrance end of a machine constructed in accordance with the invention.

The doubly washed, inverted molds continue to advance on the lower run of the conveyor. Finally, as they emerge from their return housing 138 (FIGURE 1) at the bottom of the frame, they are subjected to a disinfecting or sterilizing treatment accomplished by the discharge of suitable liquid from sprays 139 supplied through a duct 140. The empty, clean and sterilized molds round the sprockets 17 and finally are restored to their initial, upright position at the feeding end of the machine. In this fashion, the molds are utilized over and over again, being cleaned and sterilized appropriately during each cycle.

As to the mechanism which lifts the sticks and attached confections from the molds, the rising track blocks 112 are ultimately restored to their uppermost position with a carrier bar and depending confections between them. Pursuant to the invention, the individual bars 118 are advanced step by step in an intermittent fashion in time with the operation of the main conveyor. This is accomplished by a transporter which comprises, in effect, a conveyor mounted in an extension frame 141 that is part of the main frame 7. At one end, a cross-shaft 142 (FIGURE 7) spans the extension frame 141. The opposite ends of the shaft 142 carry duplicate sprockets 143. Since the mechanism is identical on opposite sides of the machine, the description of one side applies equally to the other.

At the far end of the framework 141 a cross-shaft 144 (FIGURE 1) spans the frame extension and carries a pair of sprockets similar to the sprockets 143. About aligned ones of the sprockets 143 are trained chains 146 comprised of alternating regular links and special links. The special links 147 (FIGURE 9) are provided with extending portions 148, each of which carries a pair of inwardly projecting pins 151 and 152 designed to lie fairly closely on opposite sides of the upstanding rib 119 of the carrier bar 118.

Figure 13:
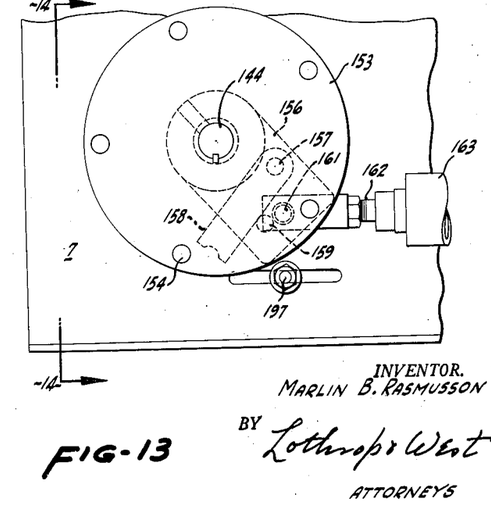
FIGURE 13 is a detail to an enlarged scale of a portion of the transporter advancing mechanism of FIGURE 2.
Figure 14:
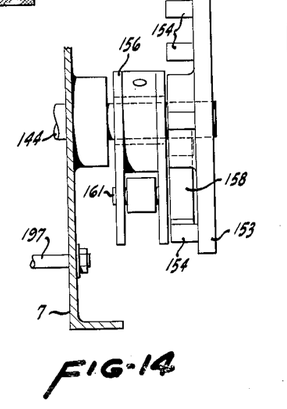
FIGURE 14 is a cross-section, the plane of which is indicated by the line 14—14 of FIGURE 13.

Means are provided for advancing the transporter chain 146 in a step by step fashion. The cross-shaft 144 (FIGURE 13) carries a disk 153 having a number of axially extending pins 154 projecting therefrom. Freely journalled on the shaft 144 is an oscillating frame 156 carrying on one side an inwardly projecting pin 157 from which a pawl 158 projects in a plane intersecting the pins 154. The pawl rests by gravity against a laterally projecting stop pin 159 on the side of the oscillating frame 156. Between the side plates of the oscillating frame 156 extends a pin 161 engaging the plunger rod 162 of a pneumatic jack 163. At its opposite end the jack 163 is secured to the frame extension 141 by a bracket 164.

Figures 9, 10, 11:
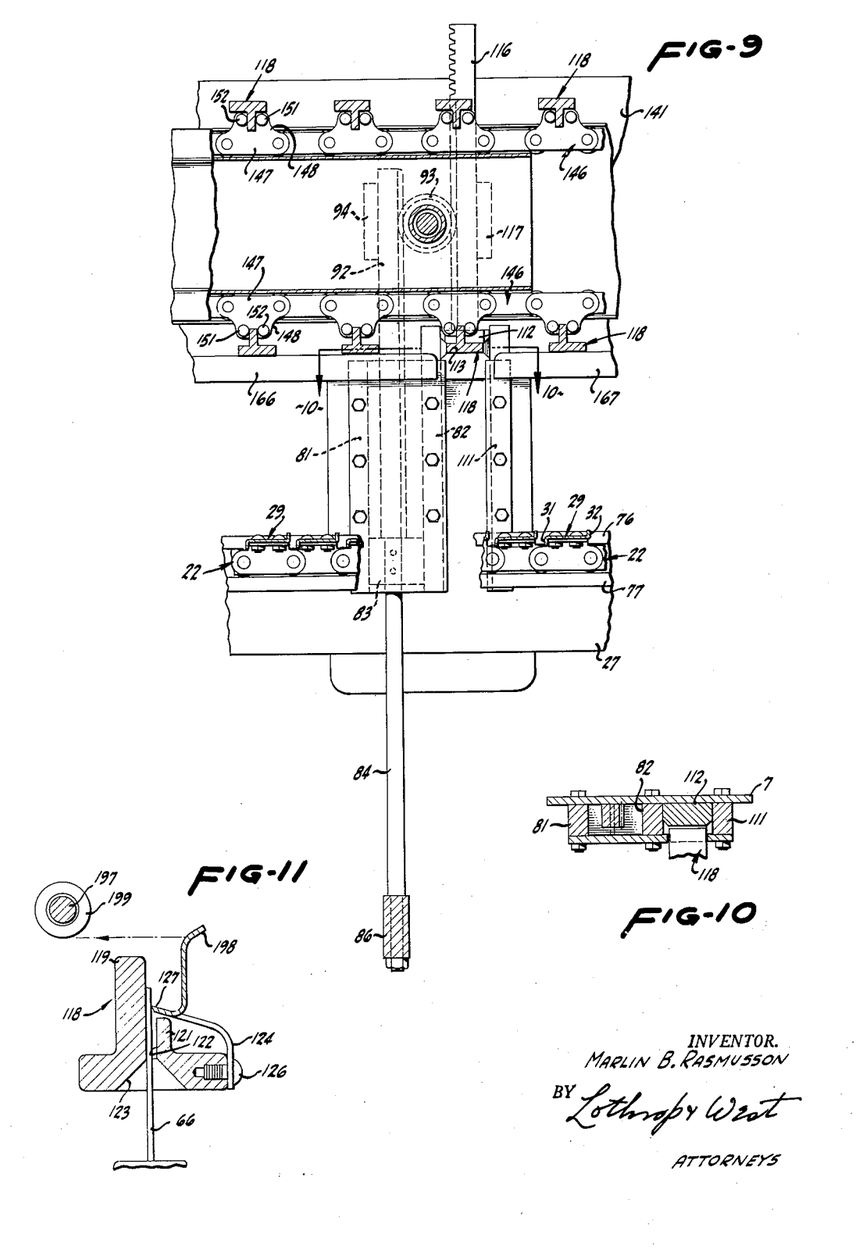
FIGURE 9 is a cross-section, the plane of which is indicated by the line 9—9 of FIGURE 8.
FIGURE 10 is a cross-section, the plane of which is indicated by the line 10—10 of FIGURE 9.
FIGURE 11 is a cross-section, the plane of which is indicated by the line 11—11 of FIGURE 8.
Figure 12:
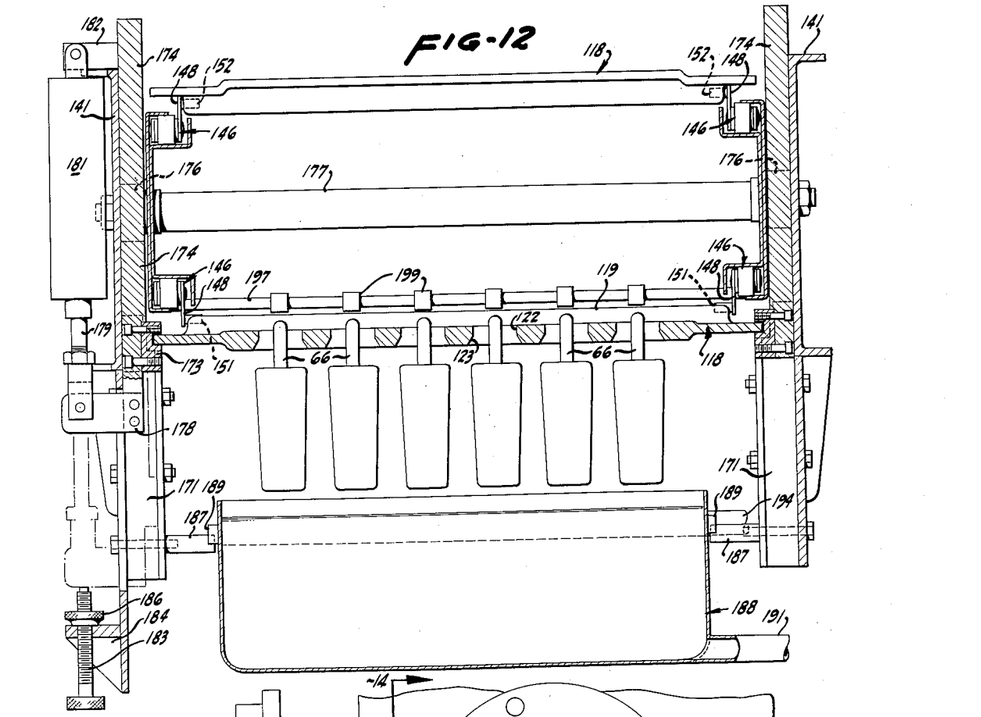
FIGURE 12 is a cross-section, the plane of which is indicated by the line 12—12 of FIGURE 2.

When the pneumatic jack 163 is appropriately energized to expel the plunger rod 162, the oscillating frame 156 is rocked around the shaft 144 to advance the pawl 158 into abutment with the next adjacent pin 154. The movement of the plunger 162 is such that the disk 153 and the shaft 144 are properly rotated and the two transporter chains 146 are appropriately advanced one step. Conveniently, the spacing is such that the transporter advances substantially twice as far per cycle as does the main conveyor. This achieves a greater spacing between the depending confections. When the connections to the pneumatic jack 163 are reversed, the shaft 144 remains stationary while the pawl 158 and the rocking frame 156 are retracted to their initial positions substantially as shown in FIGURE 10.

The effect of the step by step advancement of the transporter in time with the advancement of the main conveyor is for the adjacent trailing pin 152 of the special link 147 to engage behind the flange 119 of the adjacent, just lifted carrier bar 118 and to advance the carrier bar from its position within the track blocks 112 onto co-planar rails 166 duplicated on opposite sides of the extension frame 141. The operation of each step of the transporter conveyor in its closed path is such as to advance a filled carrier bar from the track blocks along the adjacent supporting rails 166 and also for the next link in the transporter chain to advance the next, empty carrier bar 118 from its supporting rails 167 into the track blocks 112.

Except when they are in the track blocks 112, the carrier bars rest loosely upon their supporting rails 166 and 167. The carrier bars are not fastened to the transporter chains but rather are simply advanced thereby because of the laterally interfitting contact between the pairs of pins 151 and 152 with the ribs 119 of the respective carrier bars.

As a filled carrier bar 118 advances by sliding along the rails 166 under the propulsion of the transporter chains, it arrives at a station at which dipping may take place. With some confections there is no coating supplied but with others a coating such as melted chocolate is applied by dipping. At this station on the extension frame 141 there are provided side guides 171 and 172 (FIGURE 7) which confine side blocks 173 to vertical translation. The side blocks 173 are like the track blocks 112 and are similarly engageable in turn with each of the carrier bars 118. The blocks 173 are fastened to rack bars 174 meshing with gear pinions 176 on a cross-shaft 177.

Also connected to one of the side blocks 173 is a projecting foot 178 secured to the plunger 179 of a pneumatic jack 181 connected at its upper end to a bracket 182 mounted on the extension frame 141. When the jack 181 is appropriately energized, the foot 178 is lowered carrying the side blocks 173 with it at the same rate, as regulated by the interconnected racks 174 and shaft 177. The side blocks 173 carry the momentarily intervening carrier bar 118 and depending confections between them from an upper position to a lower position. The lower position is limited by an adjusting screw 183 carried by a bracket 184 on the frame, the screw being locked in its position of adjustment by a locking hand wheel 186.

Mounted on a pair of stationary pins 187 projecting from the framework including the guides 171 and 172 is a chocolate tank 188. This is provided on its ends with arcuate bosses 189 so that the choocate tank can readily be rested upon the pairs of pins 187 and can as readily be removed therefrom for cleaning. The chocolate tank is supplied with hot liquid chocolate or other comparable coating through a supply line 191 from any suitable source (not shown). The chocolate tank has an overflow weir 192 opening into an overflow compartment 193 from which excess coating liquid discharges through an opening 194 to be returned for recirculation.

In the operation of this part of the mechanism, the confections descend with the carrier bar 118 and are immersed to any desired extent in the chocolate within the tank 188. The level of the chocolate is established by the overflow weir 192 while the depth of immersion is regulated by the stop screw 183. At the conclusion of the dipping operation, there is a reversal of the jack 181 so that the carrier bar 118 is lifted up to its initial high position. The next cycle of movement of the transporter chains 146 advances the carrier bar 118 and the depending confections a further step, with the weight then resting again on the rails 166. During this step, some of the coating chocolate may drain from the confections into the overflow compartment 193 of the chocolate tank.

As the coated confections are advanced by the transporter step by step toward the discharge end of the machine, they come to a discharge station. This station is immediately above a bagging unit 196. Conveniently, this bagging unit is substantially as shown in my Patent No. 2,842,921 and operates by supplying open top enclosing bags into which the frozen confections and sticks are dropped for subsequent sealing.

In order to release the confections from the carrier bars 118, a trip rod 197 spans the extension frame 141 adjacent the discharge end thereof. The trip rod is adjustably mounted fore and aft by lock screws 195 at its ends. The arrangement is such that as a carrier bar 118 advances step by step, toward the left in FIGURE 11, the trip rod 197 is encountered by an upwardly extending finger 198 on each of the spring plates 124 fastened to the carrier bar. The fingers 198 are not only put into abutment with an exterior cushion 199 on the rod 197 but are restrained and held as the carrier bar 118 advances. This, in effect, rocks the plate clockwise with respect to the bar 118 (as seen in FIGURE 11) and withdraws the pointed ends 127 from the sticks 66. Each stick is thereupon free to fall with its accompanying confection by gravity into the chute 201 of the bagging machine. All of the confection sticks are released substantially simultaneously and the confections fall into and through the bagger and finally travel out onto a conveyor 202 in finished condition ready for discharge from the machine.

The transporter chains follow around the sprockets near the discharge end of the machine and carry the empty carrier bars 118 with them. These bars although not attached firmly to the transporter are nevertheless confined by arcuate tracks 203 and return resting on the upper run of the transporter chain. As the returned carrier bars round the sprockets near the feeding or charging end of the machine, they engage arcuate guides 204 substantially coaxial with the shaft 142 and finally rest again on the rails 167 for recycling.

The operating mechanism for the various pneumatic jacks is not described in detail herein since it is primarily a mechanism which operates the various pneumatic mechanisms in sequence, the operation of much of the mechanism taking place alternately so that the filling function, the stick inserting function, the separating function, the dipping function and finally the releasing operation all occur while the main conveyor is stationary and between successive steps of its advancement.

Pursuant to this invention, there has been provided a frozen confection machine which is versatile in its application since the various molds can be changed from time to time and since various mixes can be supplied through the filling mechanism. The freezing of the confections is carefully controlled and accelerated by the agitation due to various motions of the machine including the intermittent operation of the molds and the stirring of the mix by the insertion of the sticks therein. The molds being repeatedly used are quite economical. They are thoroughly sterilized between cycles. The stick inserter is effective to position the sticks in a regular way without the use of the customary stick holders. The dipping is carefully regulated as is the final discharge of the product. The machine operates virtually unattended and produces a satisfactory product in an economical way and at a rapid rate.

What is claimed is:

1. A frozen confection machine comprising a frame, a conveyor intermittently movable in a first closed circuit on said frame, a transporter intermittently movable in a second closed circuit on said frame above and contiguous to said conveyor, means on said conveyor for carrying stick confections with the stick uppermost, means engageable with and disengageable from said transporter for engaging a stick, means on said frame movable into and out of heat transferring relationship with said carrying means, means on said frame vertically reciprocable between said conveyor and said transporter for disengaging and lowering said stick engaging means from said transporter to grasp a stick and to lift and engage said stick engaging means with said transporter, and means on said frame for simultaneously operating said lowering means and said movable means into said heat transferring relationship between intermittent movements of said conveyor and said transporter.

2. A frozen confection machine comprising a frame, a conveyor movable in a first closed circuit on said frame, a transporter movable in a second closed circuit on said frame above and contiguous to said conveyor, a mold on said conveyor disposed with its open end uppermost when beneath said transporter, means on said frame for providing a frozen confection with an upwardly extending stick in said mold, a stick grasping device engageable with and disengageable from said transporter, a thawing device mounted on said frame for movement into and out of relationship with a mold, means on said frame for simultaneously moving said thawing device into relationship with said mold and disengaging said stick grasping device from said transporter to grasp said stick, and means on said frame for moving said thawing device out of relationship with said mold and engaging said stick grasping device with said transporter.

3. A frozen confection machine comprising a frame, a conveyor movable in a first closed circuit on said frame, a mold on said conveyor disposed with its open end uppermost, means on said frame for providing a frozen confection with an upwardly extending stick in said mold, means on said frame for thawing said confection, means on said frame above said conveyor and over said thawing means constituting a transporter, stick grasping means engageable with and disengageable from said transporter, means for disengaging said grasping means from said transporter and lowering said grasping means into grasping relationship with said stick while lifting said thawing means to said mold, and means for lifting and reengaging said grasping means with said transporter while lowering said thawing means away from said mold.

4. A frozen confection machine comprising a frame, a conveyor on said frame movable through a freezing station, a mold on said conveyor, means for inserting a stick in said mold, means for mounting said inserting means on said frame above said mold for discharge thereinto, said mounting means including rails parallel to said conveyor, and means for holding said inserting means on said rails at any selected position along said conveyor.

5. In a frozen confection machine, a conveyor for delivering stick confections to a delivery station along a first predetermined path with the stick uppermost, a carrying means, having stick gripping means thereon, a trackway for guiding said carrier means along a second path passing over said delivery station, the portion of said trackway over said delivery station being mounted for reciprocation toward and from said delivery station whereby to move said carrier means into gripping engagement with the stick of a confection at said delivery station and back to said second path, means for pushing said carrier means along said trackway to a discharge station, and release means at said discharge station for releasing said stick gripping means whereby to release said confection from said carrier means, said gripping means comprising an abutment on said carrier means engageable with one side of said stick and a spring finger on said carrier means extending away from said delivery station and obliquely toward said abutment, said release means comprising a stationary member at said release station, engageable with said spring finger as the latter moves through said release station to thereby flex said finger away from said abutment and release said confection.

References Cited in the file of this patent

UNITED STATES PATENTS

| | | |
|---|---|---|
| 1,883,482 | Bausman et al. | Oct. 18, 1932 |
| 1,924,988 | Grayson | Aug. 26, 1933 |
| 1,960,456 | Robb | May 29, 1934 |
| 2,166,380 | Taylor | July 18, 1939 |
| 2,166,381 | Taylor | July 18, 1939 |
| 2,700,347 | Gram et al. | Jan. 25, 1955 |
| 2,761,398 | Wiezner | Sept. 4, 1956 |
| 2,911,121 | Glass | Nov. 3, 1959 |
| 2,925,052 | Glass | Feb. 16, 1960 |